May 1, 1923.
J. POTTALA
SLED
Filed Jan. 17, 1922
1,453,948
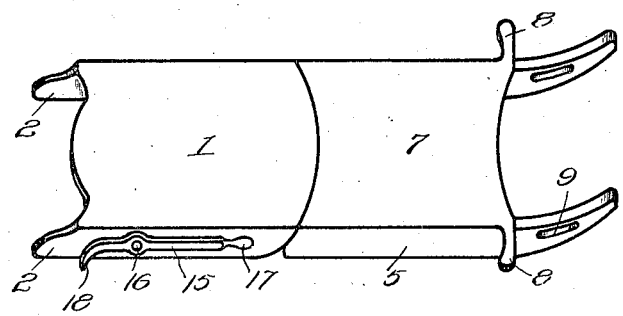
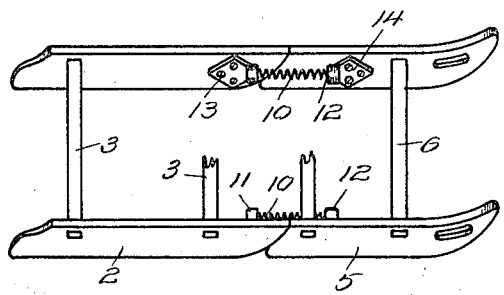
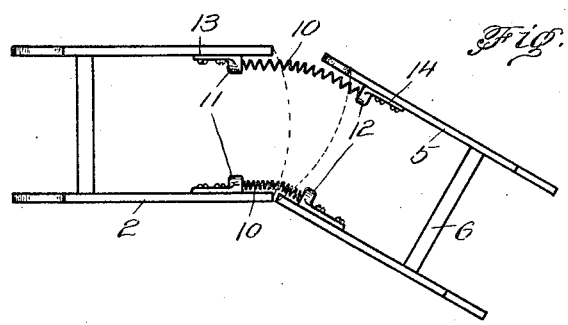
INVENTOR.
John Pottala.
BY
Geo. P. Kimmel
ATTORNEY.

Patented May 1, 1923.

1,453,948

UNITED STATES PATENT OFFICE.

JOHN POTTALA, OF FITCHBURG, MASSACHUSETTS.

SLED.

Application filed January 17, 1922. Serial No. 529,817.

*To all whom it may concern:*

Be it known that I, JOHN POTTALA, a citizen of Finland, residing at Fitchburg, in the county of Worcester and State of Massachusetts, have invented certain new and useful Improvements in Sleds, of which the following is a specification.

This invention relates to sleds and more particularly to steering mechanism therefor.

The object of the invention is to provide a sled which can be easily steered and in which the steering runners will be automatically returned to neutral position upon release of the steering means.

Another object is to provide a sled having a pair of fixed runners with a pair of movable runners connected by coiled springs to the front end of the fixed runners, the springs being so located as to be protected against entanglement with objects over which the sled is traveling, thereby avoiding all danger of the springs being broken or the sled being accidentally steered out of its course.

With these and other objects in view, the invention consists in certain novel features of construction as hereinafter shown, described and claimed.

In the accompanying drawing:

Figure 1 represents a perspective view of a sled constructed in accordance with this invention taken from one side looking down on the sled.

Fig. 2 is a similar view with the seat boards removed, and,

Fig. 3 is a plan view with the seat boards removed showing the steering runners turned to one side for guiding the sled toward the right.

In the embodiment illustrated, the sled comprises a seat board 1 with a pair of runners 2 fixed thereto, said runners being braced below the seat board by cross bars 3 and 4 which are spaced longitudinally at suitable distances apart. A pair of steering runners 5 connected by cross bars 6 and a foot or seat board 7, are movably connected with the front ends of the fixed runners 2 by heavy coiled springs 10 arranged along the inner faces of the runners as is shown clearly in Figs. 2 and 3, said springs being secured at their ends to bearing or castings 11 and 12 carried respectively, by the runners 2 and 5 and which are here shown formed integral with diamond shaped attaching plates 13 and 14, although obviously these plates may be of any other desired configuration and which operate as bracing plates for the runners in addition to attaching plates for the springs.

This arrangement of the springs 10 connects the steering runners 5 with the fixed runners and provides for them being held normally in neutral position in alinement with said fixed runners and yet permits them to be readily turned by the operator in either direction for steering the sled.

The foot or seat board 7 which is mounted on the front steering runners 5 is provided at the front end thereof with laterally extending arms 8 which form foot rests for the seat when the rider is seated on the sled or hand grips when he is lying flat thereon and which are designed to be used in steering the sled, it being obvious that a push on one and a pull on the other will turn the sled laterally in the direction desired.

The front ends of the steering runners 5 are preferably upturned as shown clearly in Figs. 1 and 2 and are equipped with longitudinally extending slots 9 for the attachment of a rope or cable (not shown) if it is desired to use such for drawing the sled.

The mounting of the springs 10 in close proximity to the inner faces of the runners avoids all danger of the same being entangled with objects in the roadway such as might tend to accidentally steer the sled out of its course or break the springs.

Mounted on the outer face of one of the rear runners 2 is a brake 15 in the form of a lever fulcrumed intermediate its ends as shown at 16 to said runner and provided at its front end with a hand grip 17 and at its rear end with a depending spur 18 which is designed to be forced into the surface over which the sled is passing to retard the speed thereof. To do this, it is obvious that the hand grip 17 is grasped and that end of the lever moved upwardly thereby forcing the spur 18 downwardly into contact with the surface over which the sled is moving. This lever 15 is so balanced that it will normally lie in the position shown in Fig. 1 and will be frictionally held in this position.

From the above description it will be obvious that the front steering runners 5 are connected with the rear runners 2 avoiding the necessity of pivotally connecting these runners and yet reliably securing them together and permitting the front runners to turn readily for steering the sled.

The connection of the front and rear sections of the sled by the coiled springs 10 not only provides for the steering of the sled but permits these sections to move longitudinally relative to each other as well as laterally which is desirable when the sled is traveling over rough places preventing all possibility of the connections between the sections being broken and yet return them quickly to normal position after such movement.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:

1. A steerable sled composed of front and rear sections and connected only by coiled springs arranged adjacent and in close proximity to one face of the runners thereof, said springs being secured at one end to the rear section and at the other to the front section.

2. A sled of the class described comprising front and rear sections, attaching plates carried by the inner faces of the runners of said sections adjacent their opposed ends, and coiled springs connected with said plates for yieldably uniting the sections.

In testimony whereof, I affix my signature hereto.

JOHN POTTALA.